(12) United States Patent
Beachey et al.

(10) Patent No.: US 6,470,755 B1
(45) Date of Patent: Oct. 29, 2002

(54) NOISE REDUCING DIFFERENTIAL PRESSURE MEASUREMENT PROBE

(75) Inventors: Terry X. Beachey, Longmont; Russell N. Evans, Louisville, both of CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 09/368,549

(22) Filed: Aug. 5, 1999

(51) Int. Cl.[7] .................................................. G01L 7/00
(52) U.S. Cl. ........................................................ 73/756
(58) Field of Search ........................ 73/756, 718, 724, 73/708, 716, 861.65, 861.66, 866.5

(56) References Cited

U.S. PATENT DOCUMENTS

| | | | | |
|---|---|---|---|---|
| 4,703,661 A | * | 11/1987 | Evers | 73/861.66 |
| 4,957,007 A | * | 9/1990 | Gray | 73/861.65 |
| 5,963,147 A | * | 10/1999 | Westfield et al. | 340/870.11 |
| 5,969,266 A | * | 10/1999 | Mahoney et al. | 73/861.65 |
| 6,089,097 A | * | 7/2000 | Frick et al. | 73/718 |
| 6,119,047 A | * | 9/2000 | Eryurek et al. | 700/38 |
| 6,170,338 B1 | * | 1/2001 | Kleven et al. | 73/861.22 |

* cited by examiner

Primary Examiner—William Oen

(57) ABSTRACT

A differential pressure measuring probe with an improved signal to noise ratio is provided. The probe includes a substantially flat longitudinally extending impact surface that is configured to create a dome of high pressure in the impacting fluid. The dome of high pressure provides an increased stagnation area on the impact surface to reduce noise in the measurement of impact pressure. A non-impact surface is provided with non-impact apertures to measure a non-impact pressure such that differential pressure between the impact surface and the non-impact surface can be calculated.

23 Claims, 9 Drawing Sheets

NOISE REDUCING DIFFERENTIAL PRESSURE MEASUREMENT PROBE

BACKGROUND OF THE INVENTION

The process industry employs process variable transmitters to monitor process variables associated with substances such as solids, slurries, liquids, vapors, and gases in chemical, pulp, petroleum, pharmaceutical, food and other processing plants. Process variables include pressure, temperature, flow, level, turbidity, density, concentration, chemical composition and other properties. A process fluid flow transmitter provides an output related to a sensed process fluid flow. The flow transmitter output can be communicated over a process control loop to a control room, or the output can be communicated to another process device such that the process can be monitored and controlled.

Measuring the rate of fluid flow in a confined conduit by modifying the internal geometry of the conduit and applying an algorithm to the measured differential pressure in the flowing fluid, is known. The geometry of the conduit is traditionally changed by altering the cross section of the conduit, such as with a venturi meter, or by the insertion into the conduit of a flow altering device such as a orifice plate, or an averaging pitot tube or the like.

An averaging pitot tube generally includes a shaped bluff body that slightly impedes fluid flow within the conduit. One limitation of some averaging pitot tubes is a relatively lower signal to noise ratio in the differential pressure data being sensed. "Noise" in the context of a differential pressure measuring device, such as a flow transmitter, is the instantaneous deviation from an average pressure reading from one data point to another. The noise generated in a pitot tube type of differential pressure sensor originates in the impact pressure ports on the upstream facing side of the pitot tube and in the low pressure ports on the downstream side of the pitot tube.

As differential pressure transmitters and data acquisition systems have become more sophisticated and responsive, they have also become more sensitive to and are increasingly influenced by the noise generated by the pressure sensing unit. Accordingly, the noise characteristics of differential pressure sensing devices have become a more important factor in their selection and operation. Thus, there is a need to provide an improved differential pressure sensing device with an improved signal to noise ratio.

SUMMARY OF THE INVENTION

A differential pressure measuring probe with an improved signal to noise ratio is provided. The probe includes a substantially flat longitudinally extending impact surface that is configured to create a dome of relatively high pressure in the impacting fluid proximate one or more impact apertures. The dome of high pressure provides an increased stagnation area on the impact surface to quickly provide a more accurate measurement of pressure. A non-impact surface is provided with non-impact apertures to measure a non-impact pressure at a stagnation point such that differential pressure between the impact surface and the non-impact surface can be calculated.

DETAILED DESCRIPTION

Although the invention will be described with reference to specific embodiments of differential pressure measuring probes, workers skilled in the art will recognize that changes can be made in form and detail without departing from the spirit and scope of the invention, which are defined by the appended claims.

Figure 1:
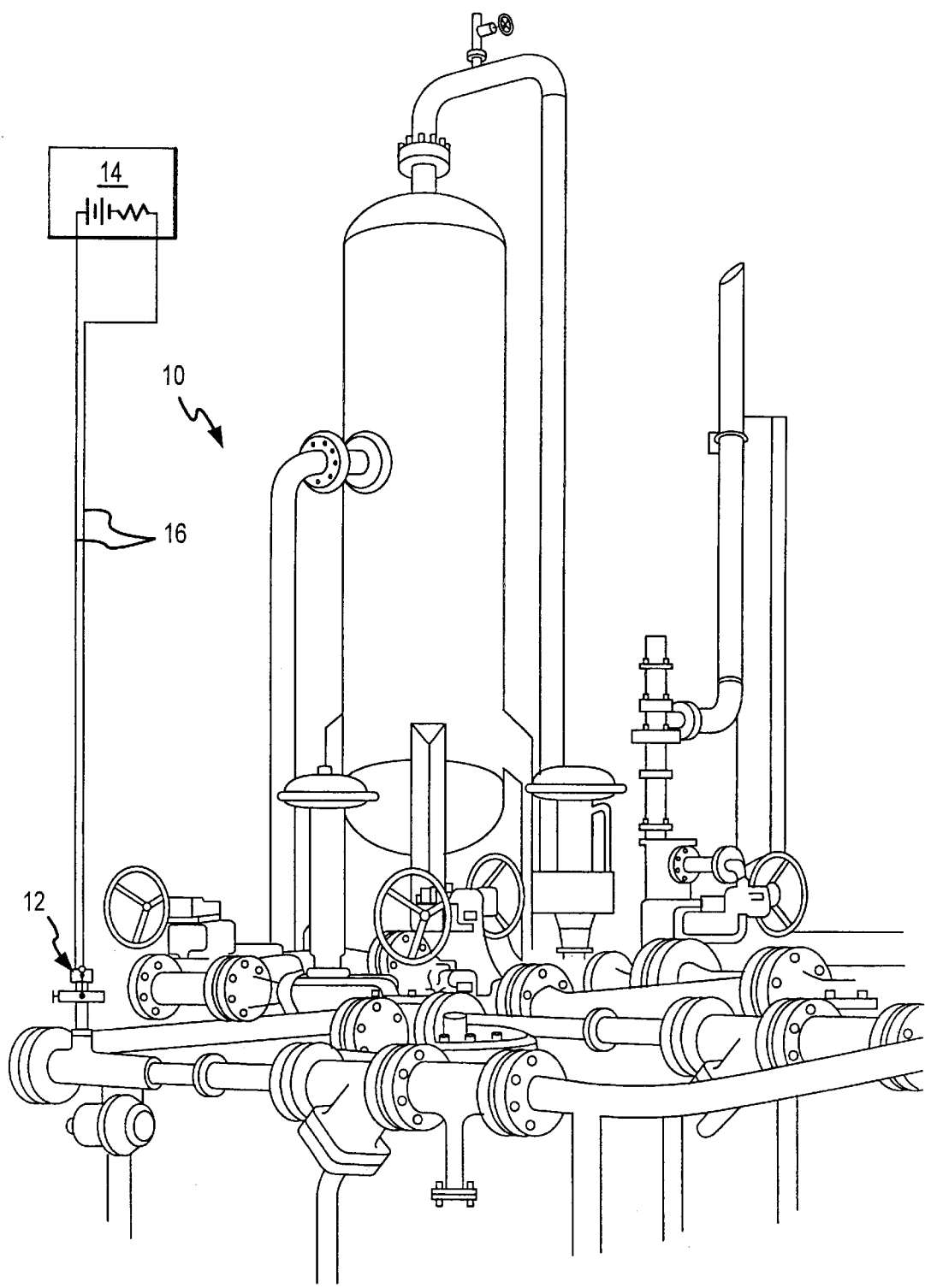
FIGS. 1 and 2 are diagrammatic views of a process measurement system illustrating the environment of embodiments of the invention.

FIG. 1 is a diagrammatic view of a process control system 10, illustrating one example of an environment of embodiments for the invention. Pressure measurement system 12 is coupled to control room 14 (modelled as a voltage source and resistance) through process control loop 16. Loop 16 can utilize any appropriate protocol to communicate flow information between measurement system 12 and control room 14. For example, process control loop 16 operates in accordance with a process industry standard protocol such as Highway Addressable Remote Transducer (HART®), FOUNDATION™ Fieldbus or any other appropriate protocol.

Figure 2:
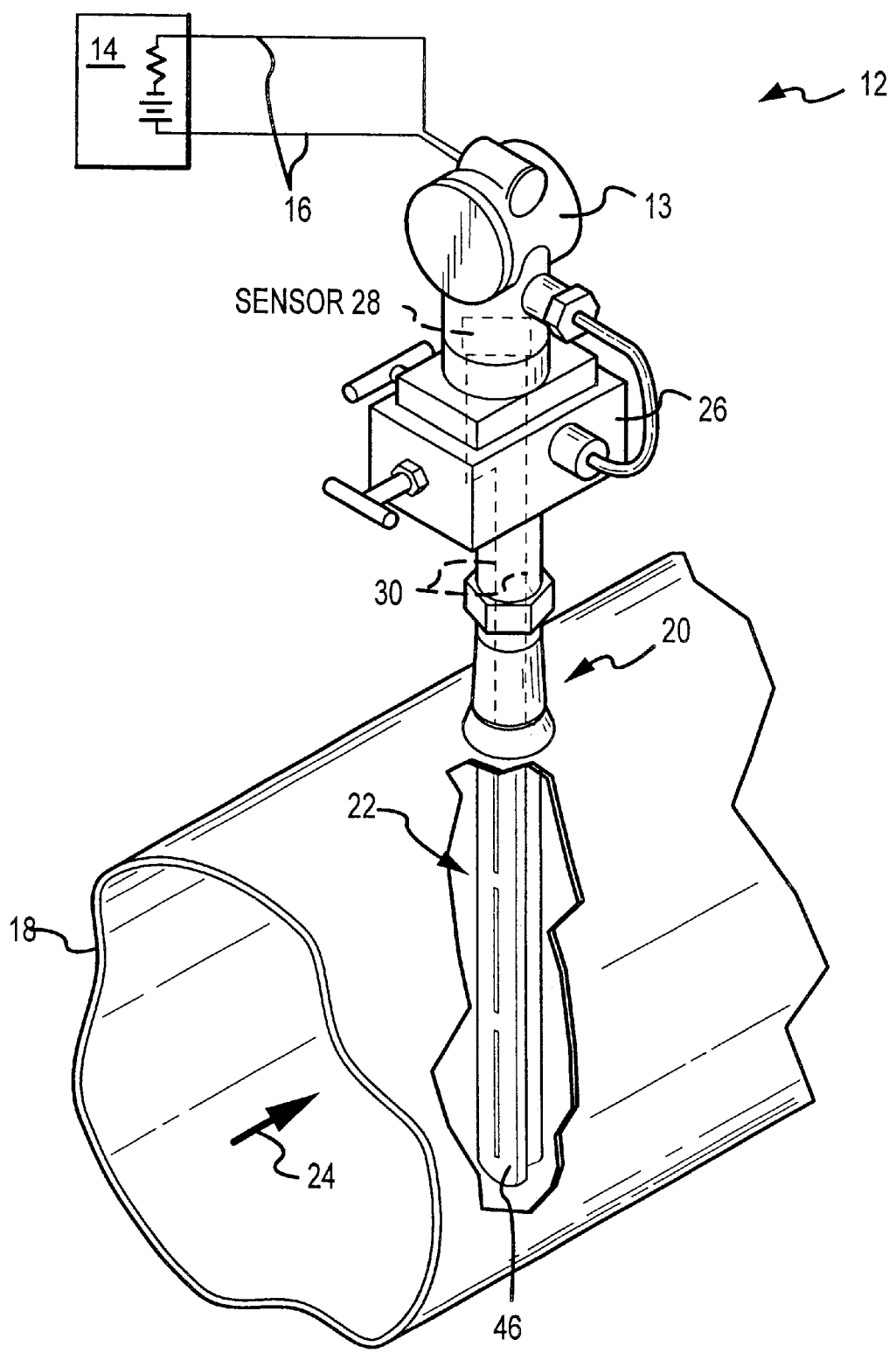

FIG. 2 shows a cut away portion of a process fluid container such as a pipe, or closed conduit, 18 into which is installed a differential pressure measuring probe 20 of the averaging pitot tube type. The bluff body 22 of probe 20 is constructed in accordance with an embodiment of the invention that will be described in greater detail later in the specification. Bluff body 22 diametrically spans the inside of pipe 18. The directional arrow 24 in FIG. 2 indicates the direction of fluid flow in the pipe 18. A fluid manifold 26 and flow transmitter 13 are shown mounted on the exterior end of pitot tube 20. Transmitter 13 includes a pressure sensor 28 that is fluidly coupled to probe 20 through passageways 30 (shown in phantom in FIG. 2).

Figure 3:
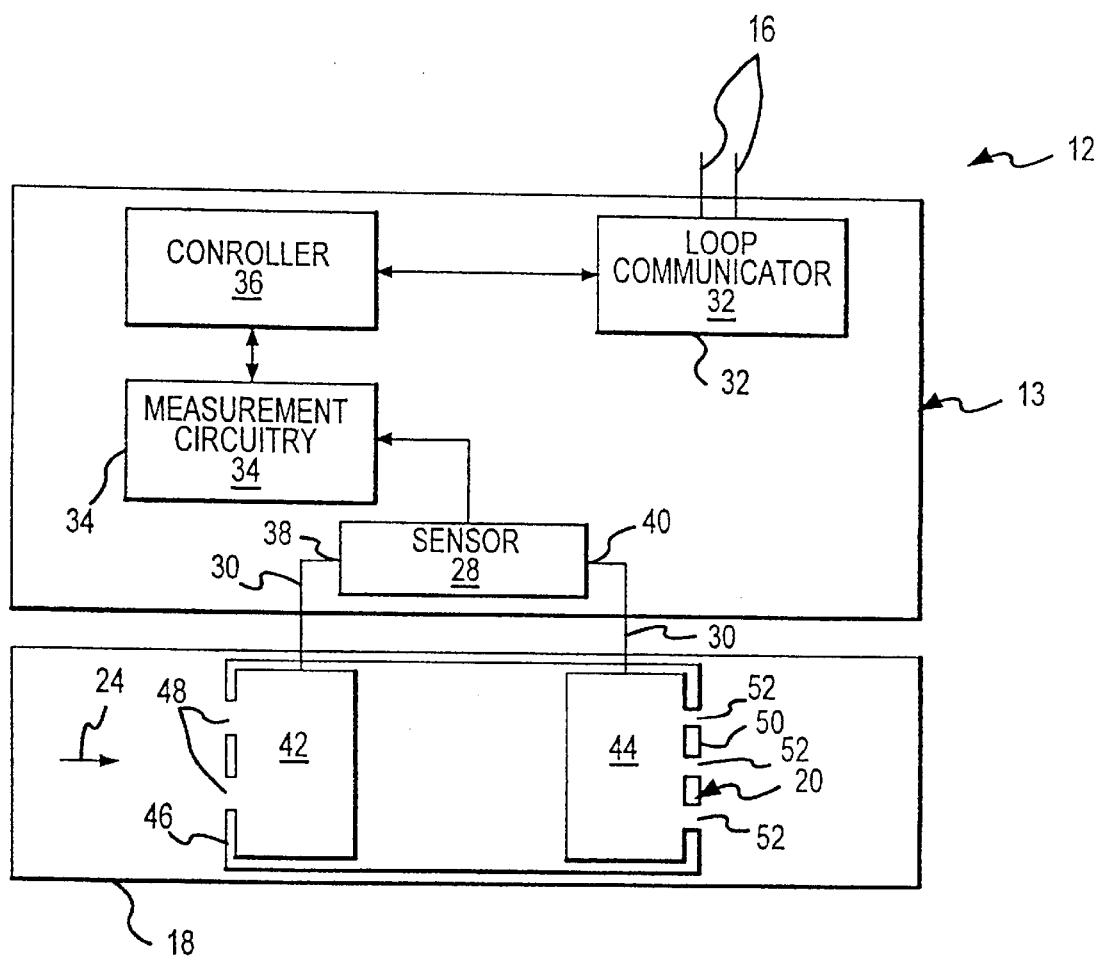
FIG. 3 is a system block diagram of the process measurement system.

FIG. 3 is a system block diagram of differential pressure measurement system 12. System 12 includes flow transmitter 13 and differential pressure measurement probe 20. System 12 is coupleable to a process control loop such as loop 16 and is adapted to communicate a process variable output related to a differential pressure of fluid flow within pipe 18. Transmitter 13 of system 12 includes a loop communicator 32, pressure sensor 28, measurement circuitry 34, and controller 36.

Loop communicator 32 is coupleable to a process control loop, such as loop 16, and is adapted to communicate upon the process control loop. Such communication can be in accordance with any appropriate process industry standard protocol such as the protocols discussed above.

Pressure sensor 28 includes first and second inlets 38, 40 Which are coupled to first and second plenums 42, 44 respectively through passageways 30. Sensor 28 can be any device that has an electrical characteristic that changes in response to changes in applied pressure. For example, sensor 28 can be a capacitive pressure sensor the capacitance of which changes in response to the differential pressure applied between ports 38, and 40. If desired, sensor 28 can include a pair of pressure sensitive elements such that each plenum is coupled to its own pressure sensitive element.

Measurement circuitry 34 is coupled to sensor 28 and is configured to provide a sensor output related to the differential pressure that exists between ports 38 and 40. Measurement circuitry 34 can be any electronic circuitry that can provide a suitable signal related to differential pressure. For example, measurement circuitry can be an analog-to-digital converter, a capacitance-to-digital converter or any other appropriate circuitry.

Controller 36 is coupled to measurement circuitry 34 and loop communicator 32. Controller 36 is adapted to provide a process variable output to loop communicator 32, which output is related to the sensor output provided by measurement circuitry 34. Controller 36 can be a programmable gate array device, microprocessor, or any other appropriate device.

Although loop communicator 32, measurement circuitry 34 and controller 36 have been described with respect to individual modules, it is contemplated that they can be combined such as on an Application Specific Integrated Circuit (ASIC).

Differential pressure measurement probe 20 is coupled to transmitter 13 by passageways 30. Thus, port 38 of sensor 28 is coupled to a first plenum 42, while port 40 of sensor 28 is coupled to a second plenum 44. A "plenum" is a passageway, a channel, a tube or the like into which fluid of a particular character or pressure is directed or admitted and through which fluid pressure is communicated, conveyed or transmitted.

Figure 4:
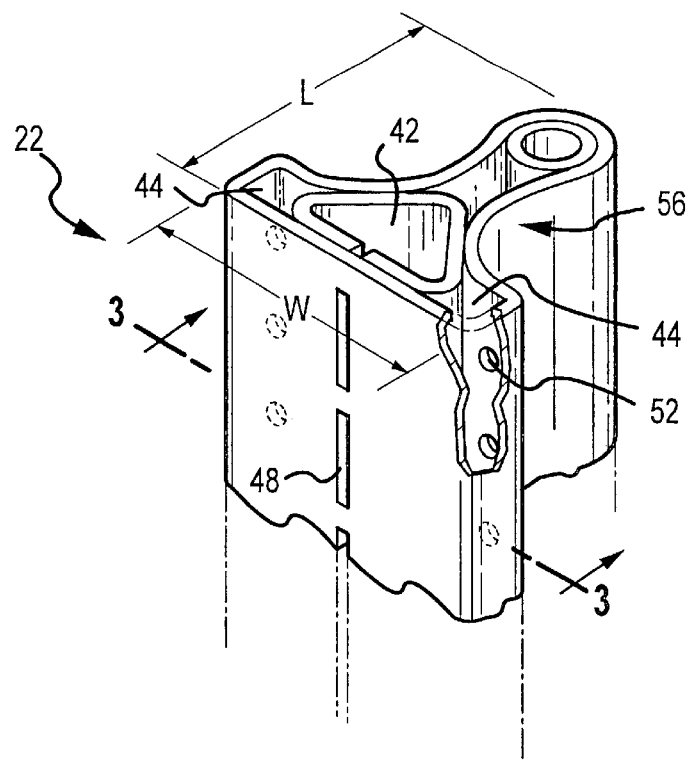
FIG. 4 is a fragmentary perspective view of a "T" shaped form bluff body of an embodiment of the invention with a portion cut away to better reveal the total construction.
Figure 5:
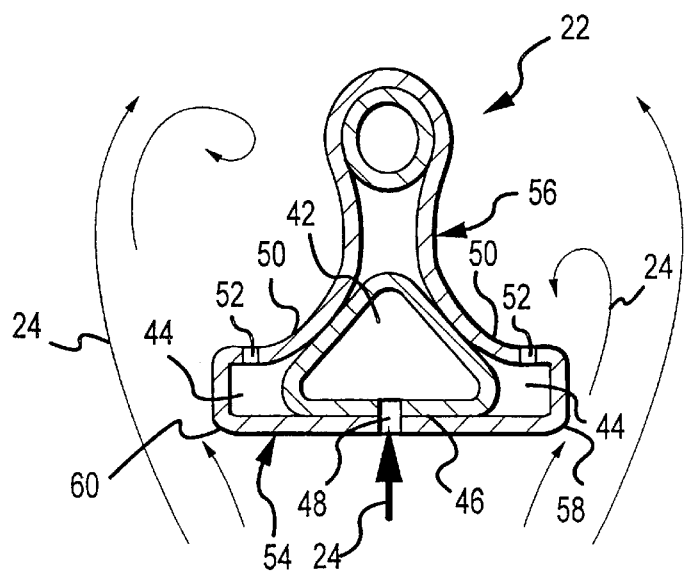
FIG. 5 is a cross sectional view taken along lines 3—3 of FIG. 4. The curved arrows show the general direction of fluid flow around the body.

The buff body 22 includes a first plenum 42, a longitudinally extending impact surface 46 with at least one impact aperture 48 disposed to communicate fluid pressure from the impact surface 46 through the plenum 42 and conduits 30 to port 38 of sensor 28. In various different embodiments, the impact surface 46 may have a width ranging between about 12.7 millimeters (0.50 inches) to about 50.8 millimeters (2.00 inches). As shown in FIGS. 2, 4, and 5, substantially all of impact surface 46 is normal to the upstream direction of fluid flow which is indicated by arrow 24. As can be seen from FIGS. 2 and 4–8, the at least one impact aperture 48 can have any appropriate width. For example, aperture 48 can have a width between about 0.762 millimeters (0.030 inches) and about 6.35 millimeters (0.250 inches) . A ratio of plenum width to aperture width greater than about 8:1 appears to provide beneficial results. Aperture 48 can take the form of a longitudinally extending slit or any other shape, including the traditional circular or oval opening. A slit opening provides enhanced noise reduction in the impact pressure signal, and thus increases the signal to noise ratio of the measurement system. When a slit is used, it is important for the width of the slit to be less than an interior width of the plenum with which it is in communication. A plurality of slits can be used that are spaced from one another laterally, or longitudinally. Further still, slits can be used for the downstream apertures as well as circular openings.

Second plenum 44 includes a non-impact surface 50 spaced from impact surface 46. Surface 50 includes at least one non-impact aperture 52 disposed to communicate pressure from the non-impact surface via plenum 44 to port 40 of sensor 28. As can be seen in FIGS. 2, and 4–8, a variety of geometries can be used with embodiments of the invention. Generally, with each embodiment at least one of the first and second plenums 42, 44 is shaped to create a fluid stagnation point at the at least one non-impact aperture 52. If a second plenum is not needed, a pressure tap can be provided in the wall of pipe 18 such that non-impact aperture 52 is disposed within pipe 18 to communicate a non-impact pressure to port 40. For example, aperture 52 can be disposed proximate an inside wall of pipe 18. Additionally, flow transmitter 13 and probe 20 can be factory matched to provide enhanced accuracy, longevity and diagnostics for a particular differential flow measurement application.

FIGS. 4 and 5 respectively show fragmentary perspective and cross sectional views of the bluff body portion 22 of the pitot tube 20. As illustrated, a cross section of the bluff body resembles the letter "T", including a bar portion 54 having a blunt, substantially flat impact surface 46 on the "top" of the letter "T". The cross section of the body also illustrates the stem portion 56 of letter "T," depending from the center of the bar 54 and disposed generally perpendicularly thereto. In the perspective view of the bluff body (FIG. 4) the so-called "stem" of the "T" is seen to be a longitudinally extending rib 56 that projects in a downstream direction from the back side of the flat faced bar 54.

In order to increase the signal-to-noise ratio of the low pressure measurement, the ratio of length to width (L/W) of bluff body 22, as shown in FIG. 4, should be greater than about one half (½) and less than about one and one half (1½). A ratio of one (1) appears to provide the advantageous results.

The first and second plenums 42 and 44 are disposed along the length of and within the bluff body and extend into the portion of the pitot tube 20 that projects outside of fluid-carrying conduit 18 to flow transmitter 13.

FIG. 2 shows the bluff body 22 oriented within fluid-carrying conduit 18 so that the blunt, flat impact surface 46 faces the fluid flow front and is perpendicular to the direction of fluid flow 24. Such orientation provides a relatively large dome of high pressure extending across surface 46, and thus creates a more effective impact stagnation zone. The projecting rib 56 is generally parallel to the direction of fluid flow in the conduit 18.

The normal plurality of circular high pressure conducting apertures in the upstream facing surface of a bluff body of a traditional averaging pitot tube are replaced, in the embodiments shown in the drawings, with one or more narrow slit openings, each positioned centrally widthwise of bar portion 54 and extending longitudinally substantially the entire length of bluff body 22. The slits provide communication between the high pressure (impact) fluid in conduit 18 and plenum 42 thus conducting the impact pressure of the flowing fluid into plenum 42 and to port 38 of pressure sensor 28 within flow transmitter 13. As opposed to a plurality of spaced apart circular apertures, the slit configuration provides a further reduction in the noise associated with the measurement of the high fluid pressure, provided that the narrow slit serves as the entry to a wider and larger plenum. In order to achieve the noise reduction, the slit should not act as the plenum itself. For example, if the slit in the bar face is 0.762 millimeters (0.030 inches) wide and plenum 42 is 3.2 millimeters (0.125) inches wide, a satisfactory ratio would exist. These dimensions and the ratio are exemplary only and should not be taken as restrictive or limiting.

The non-impact fluid is directed into second plenum 44 in pitot tube 20 through one or more downstream apertures 52, or alternatively, a longitudinally extending slit, located behind bar 54 of the bluff body 22. As shown in FIG. 5, bar portion 54 of bluff body 22 creates shedding vortices in the fluid flowing around edges 58 and 60 of the lateral extremities of bar 54, producing stagnation of the fluid in the area adjacent the back side 50 of the bar 54 and around the lateral sides of projecting rib 56. The main function of the rib 56 of the "T" shaped embodiment is to extend in a downstream direction, the point of reattachment of the fluid vortices that are created by the lateral edges 58 and 60 of the flat faced bar 54. Deferring reattachment of the vortices increases the size of the stagnation zone, thus reducing the residual noise in the low pressure component of the differential pressure measurement.

Sharp corners on the upstream lateral edges 58 and 60 of the bar 54 will produce shedding vortices around the bar, however violent or abrupt vortices are less desirable for production of fluid stagnation resulting quiescence than vortices produced by smoother rounded lateral edges of the bluff body's fluid profile. While specific roundness specifications must depend on the size of the bluff body which, in turn depends on the size of the fluid carrying conduit, it may be said that for a bluff body sized for a 25.4 cm (ten inch) diameter pipe, leading edge corners having a radius of about 0.4 to 0.8 millimeters (1/64 to 1/32 of an inch) can be suitable.

The blunt impact face of the bluff body, together with the rounded lateral edges, produce enhanced fluid flow characteristics and shedding vortices that provide the noise reducing quiescence in the flowing fluid. Although one embodiment of the invention utilizes an impact surface that would, in ordinary parlance, be considered "flat," it is apparent that an impact face that departs somewhat from the nominal "flat" surface can also be used. For example, a slightly convex surface would suffice, as well as a moderately undulating, roughened or scalloped surface. A concave surface would preserve the fluid flow characteristics and its lateral edges would provide the requisite flow separation. Accordingly, for purposes of the description of the invention and the accompanying claims, "flat" means a surface having a convex, or upstream facing, deviation from a nominal flat surface of not more than 0.134 times the width of the bluff body (0.134×W) or having an unlimited concave deviation from a nominal flat surface.

Figure 6:
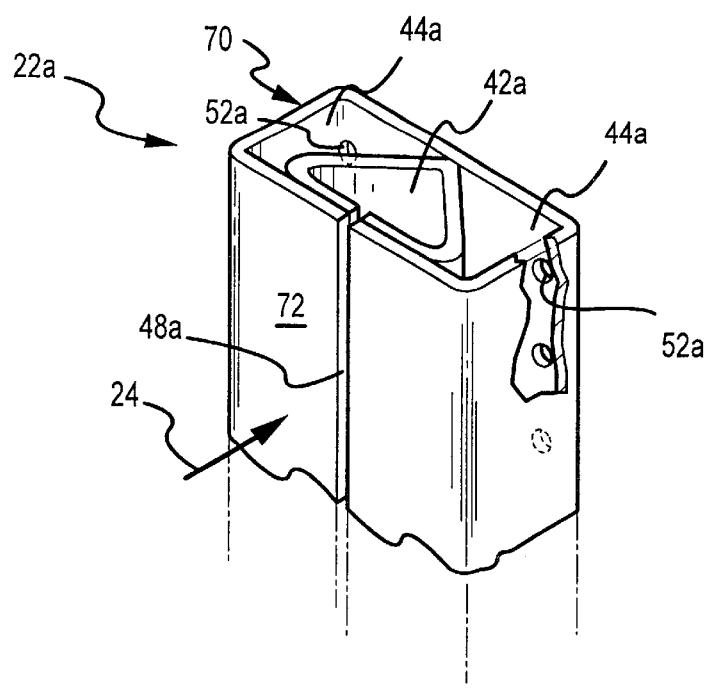
FIG. 6 is a fragmentary perspective of another embodiment showing a form of the flat-face bluff body.
Figure 7:
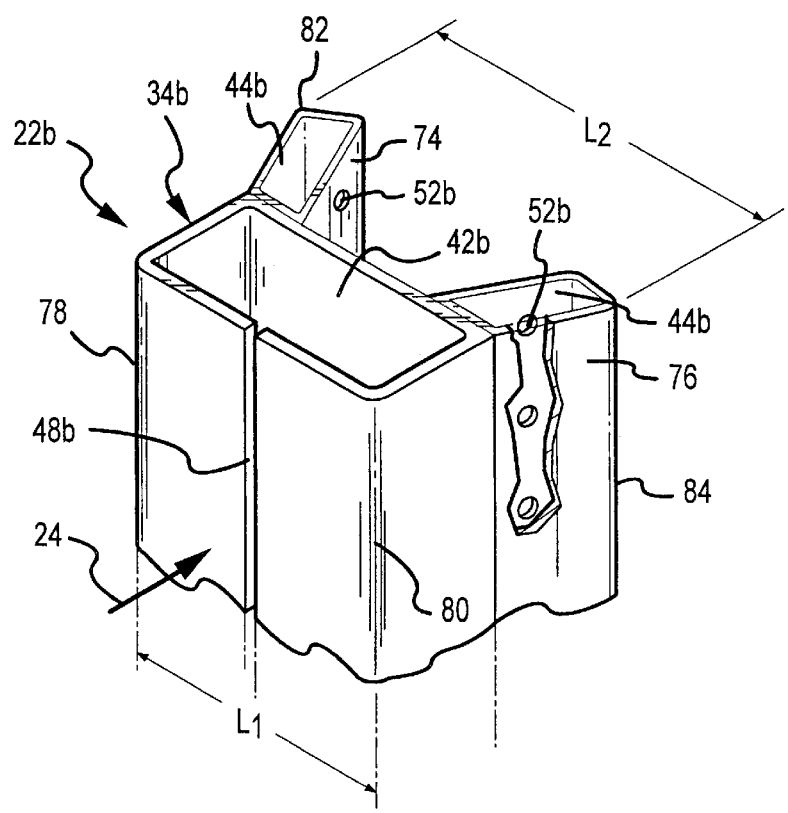
FIG. 7 is a fragmentary perspective view of another embodiment illustrating a substantially "V" shaped cross section for the flat-face bluff body.
Figure 8:
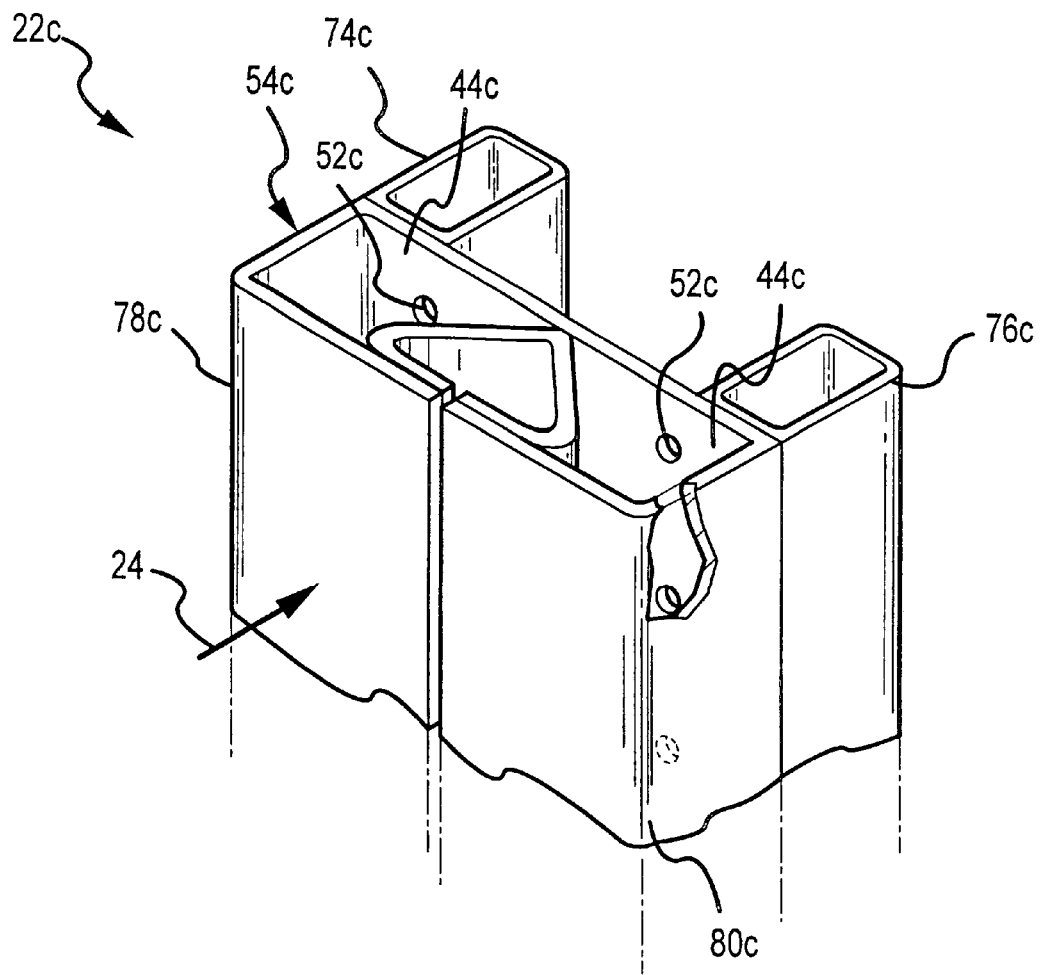
FIG. 8 is a fragmentary perspective view of another embodiment, illustrating a substantially "U" shaped cross section for the flat-face bluff body.

Additional embodiments of the invention are shown in FIGS. 6–8. In each, the blunt, flat impact face having one or more narrow high pressure fluid admitting slit openings is a common feature. The primary difference between the alternative embodiments and the embodiment described above is the shape and position of the downstream depending extensions of the bar that provide delay in the reattachment of the vortices. Different designs of the downstream extension result in variation of the shape and size of the fluid stagnation zones. Selection of the particular form or design of the bluff body's extension member may depend on several factors incident to the measuring environment, such as, for example, cost, the character of the fluid; the range of fluid flow rates or the size of the conduit carrying the fluid, among others.

FIG. 6 depicts a basic form of a bluff body 22a, one having no reattachment extension or projecting rib. A body 70 is provided with a flat impact facing surface 72 having at least one narrow slit 48a that conducts the high pressure fluid into first plenum 42a, through the bluff body, and into the exterior portion of the pitot tube and on into flow transmitter 13. Confined spaces 44a in the interior of the body communicate with non-impact apertures 52a and conduct the low pressure fluid through the body, into the exterior part of the pitot tube, and into flow transmitter 13. The stagnation zone created by the shedding vortices is smaller than that created by the "T" shaped embodiment shown in FIGS. 2 and 4–5, but nevertheless provides improvement in the reduction of residual noise in the low pressure measurement. The provision of impact slits 48a in the face of the bluff body achieves a similar increase in signal-to-noise ratio in the high pressure measurement as found in the "T" shaped embodiment.

FIG. 7 illustrates a "V" shaped form of a bluff body 22b having a flat faced bar portion 34b that faces upstream and is provided with the same one or more longitudinally extending impact slits 48b and a first plenum 42b. The downstream extension for deferring reattachment of fluid vortices takes the form of a pair of projecting ribs or legs 74 and 76, depending from the lateral extremities of the back side of the bar 34b and diverging outwardly into the stream of flowing fluid. As between the bar edges 78 and 80 and the outside lateral edges 82 and 84 of the legs 74 and 76, the lateral edges of the legs (the lateral edges of the fluid profile of the body) create the greatest amount of separation of the fluid boundary layer, producing a zone of fluid quiescence between the legs. The width $L_1$ of the bar 34b should be less than or equal to total width $L_2$ of the total bluff body. A plurality of longitudinally spaced apart non-impact apertures 52b are located on the interior sides of the legs 74, 76 and communicate with second plenums 44b in the body of the legs to-convey the low pressure fluid to the pressure transducer.

Another embodiment of a bluff body 22c of the present invention is shown in FIG. 8. The primary difference between this form of the bluff body and that of FIG. 7 is that legs 74c and 76c are positioned perpendicularly to the back side of the bar 54c, forming a structure having a lateral cross section that resembles the letter "U." Vortices are shed from the upstream edges 78c and 80c of the bar 54c, similarly to the action seen in the embodiment shown in FIGS. 2 and 4–5. The stagnation zone is created between the legs 74c and 76c of the bluff body 22c. A plurality of longitudinally spaced apart non-impact apertures 52c are located on the back side of the bar 54c, interiorly of the legs 74c and 76c and communicate with interior spaces or plenums 44c in the body of the legs to convey the low pressure fluid to port 40 of pressure sensor 28 in flow transmitter 13.

Figure 9:
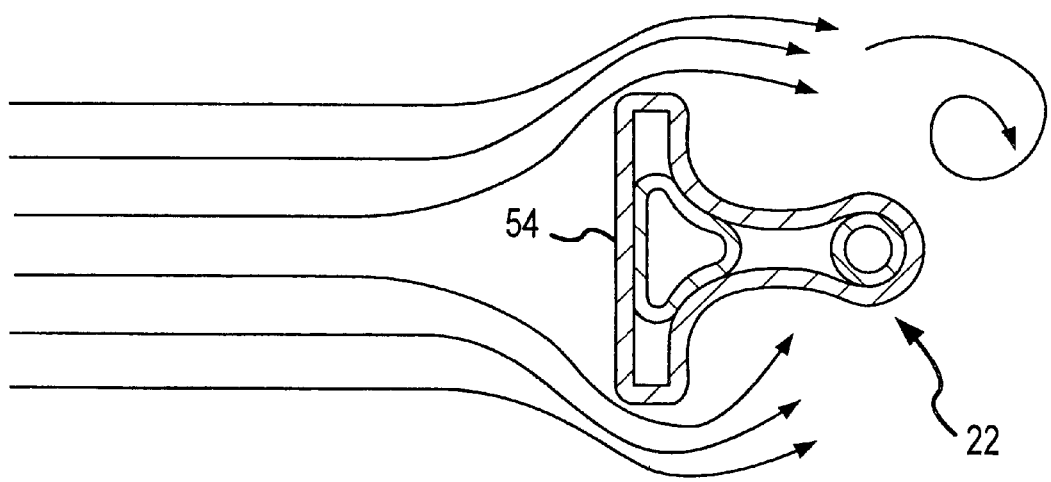
FIG. 9 is a diagrammatic view of fluid flowing around the differential pressure measurement probe shape of FIG. 4.

FIG. 9 is a diagrammatic view of fluid flowing around the differential pressure measurement probe shape of FIG. 4. As shown in FIG. 9, the substantially flat impact surface creates a dome of high pressure in the fluid proximate the impact surface.

Figure 10:
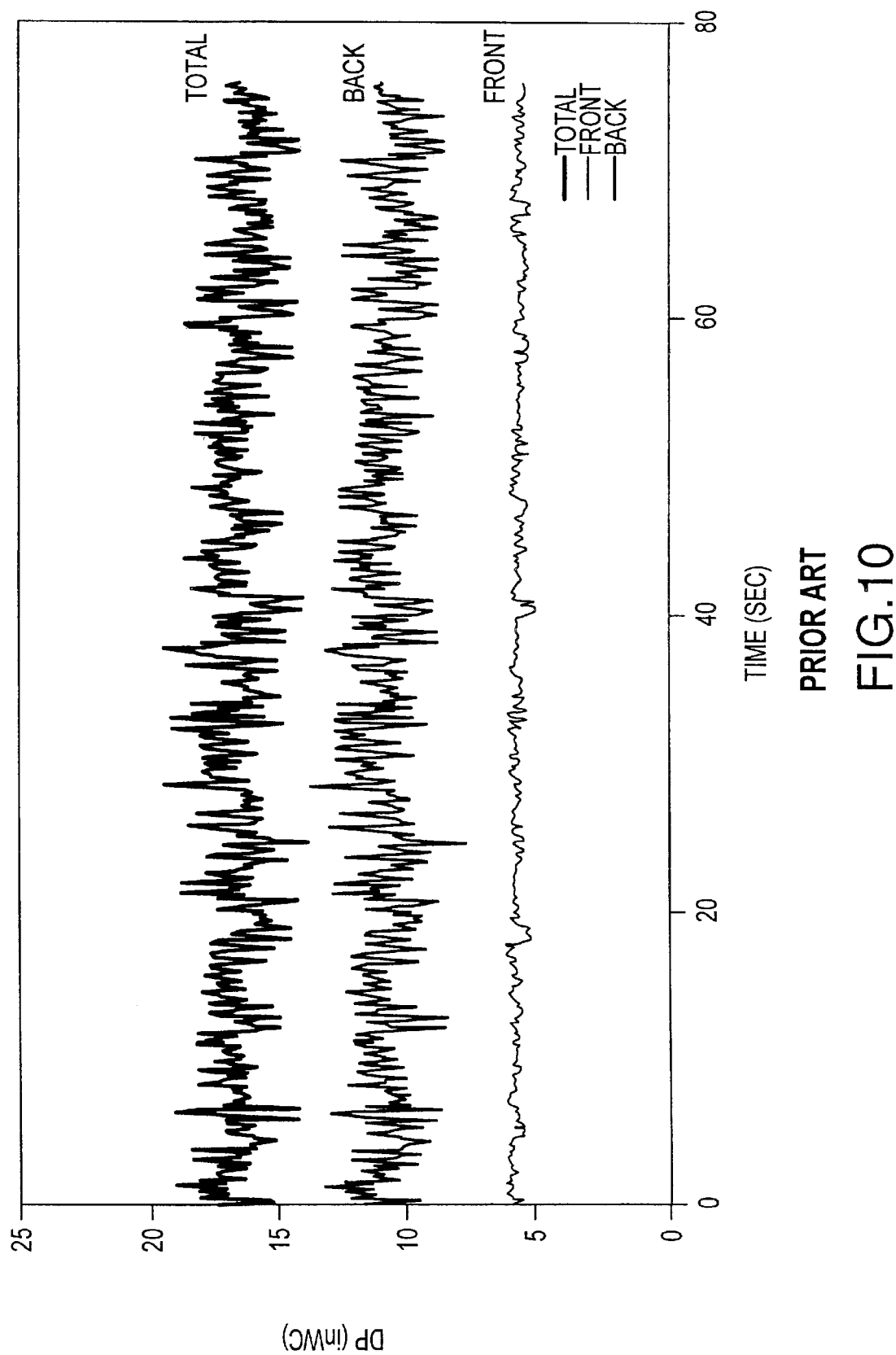
FIG. 10 is a chart of pressure versus time illustrating typical noise characteristics of prior art pitot tube type of differential pressure measuring probe, such as the probe disclosed in U.S. Pat. No. 4,559,836.
Figure 11:
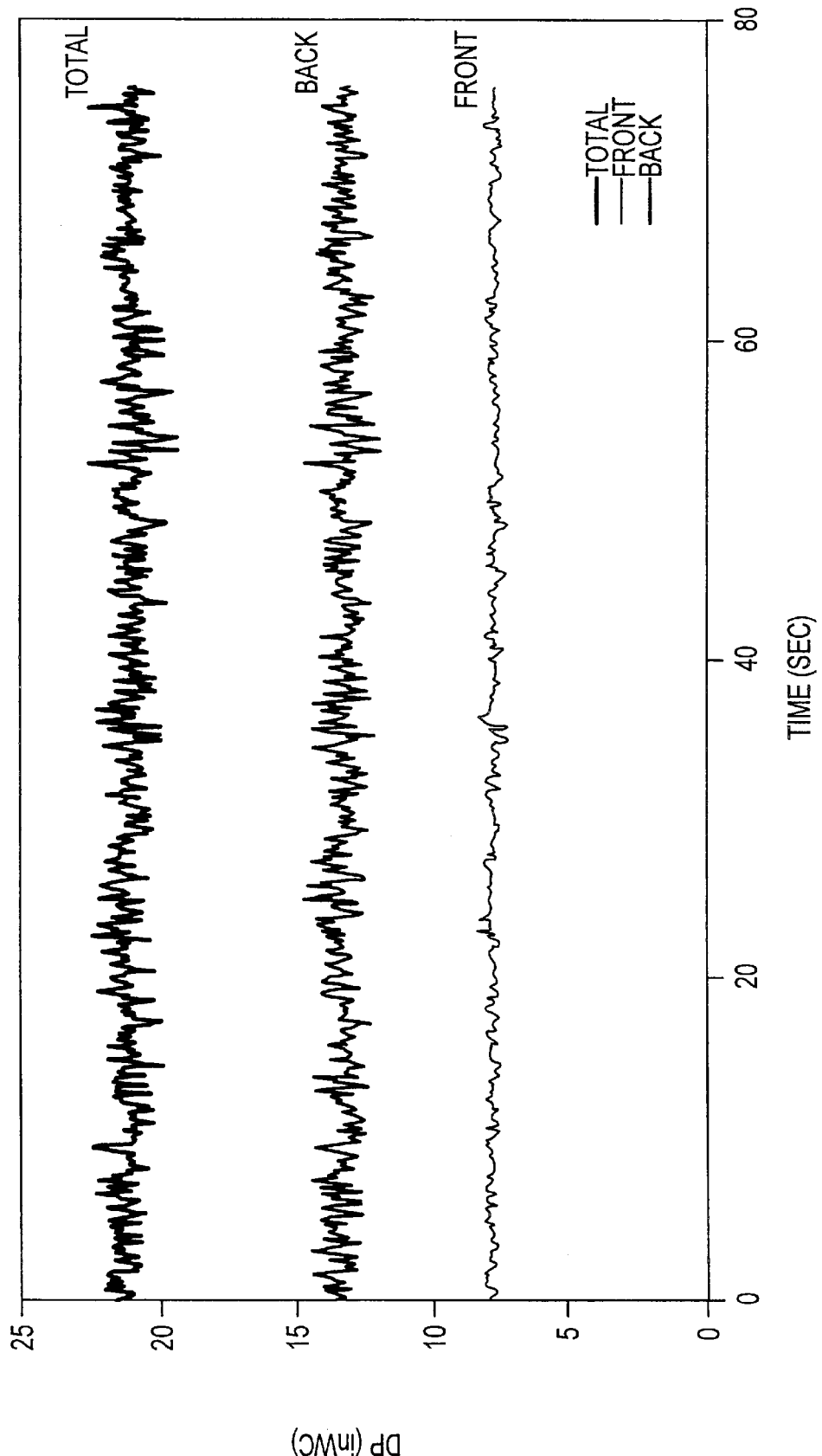
FIG. 11 is a chart of pressure versus time illustrating the improved noise characteristics of the differential pressure measuring probe of the present invention.

FIG. 10 is an exemplary chart showing the noise characteristics of a prior art differential pressure measurement probe, such as the one illustrated in U.S. Pat. No. 4,559,836. FIG. 11 is a similar chart to that of FIG. 10, however, FIG. 11 illustrates the noise characteristics of the differential pressure measurement probe of the present invention that incorporates both the substantially flat impact surface, and the longitudinally extending slit shown in FIGS. 2 and 4–8. As shown by these charts, appreciable noise reduction in a differential pressure measurement system is achieved by the present invention. Such noise reduction provides for quicker calculation of an accurate indication of differential pressure, thus potentially providing more effective process control.

What is claimed is:

1. A differential pressure measurement system coupleable to a process control loop and adapted to communicate a process variable output related to a differential pressure of a fluid flow within a fluid-carrying conduit, the system comprising:
  a process pressure transmitter including:
    a loop communicator coupleable to the process control loop and adapted for communication upon the process control loop;
    at least one pressure sensor having first and second pressure inlets;
    measurement circuitry coupled to the at least one pressure sensor and configured to provide a sensor output related to differential pressure between the first and second pressure inlets;
    a controller coupled to the measurement circuitry and the loop communicator, the controller adapted to provide a process variable output to the loop communicator, the process variable output related to the sensor output; and
    a differential pressure measurement probe adapted for placement within the fluid-carrying conduit, the probe including:
    a first plenum coupled to the first pressure inlet, the first plenum including a longitudinally extending impact surface with at least one impact aperture disposed to communicate pressure from the impact surface to the first pressure inlet;
  a non-impact surface spaced from the impact surface, the non-impact surface having a non-impact aperture disposed to communicate pressure from the non-impact surface to the second pressure inlet.

2. A differential pressure measuring probe adapted for diametric placement within a fluid-carrying conduit, comprising,
  a body having an upstream facing impact surface and at least one downstream non-impact surface, where the upstream facing impact surface is substantially flat and adapted to be disposed perpendicularly to the direction of fluid flow in the conduit,
  at least one fluid pressure transmitting plenum within the body, and
  at least one opening in the flat upstream facing impact surface of the body, establishing fluid communication between the fluid in the conduit and the at least one fluid pressure transmitting plenum, whereby the flat upstream facing impact surface of the probe body creates a relatively quiescent stagnation area upstream of the probe.

3. The probe of claim 2 and further comprising,
  at least one non-impact fluid pressure transmitting plenum within the body, and
  at least one opening in the at least one non-impact surface of the body establishing fluid communication between the fluid in the conduit and the at least one non-impact fluid pressure transmitting plenum.

4. The probe of claim 3 where the body includes a longitudinally extending and downstream extending hollow rib portion having at least one of the non-impact surfaces and containing therein the at least one fluid pressure transmitting plenum.

5. The probe of claim 2 where the downstream non-impact surface is substantially flat and parallel to the flat upstream facing impact surface.

6. The probe of claim 3 where the downstream non-impact surface is substantially flat and parallel to the flat upstream facing impact surface and where the at least one opening in the downstream surface is in the said substantially flat non-impact surface.

7. The probe of claim 3 where the body includes,
  a pair of spaced apart downstream extending legs, each having a downstream non-impact surface.

8. The probe of claim 7 where the legs are hollow and have a plurality of bounding walls and where the at least one fluid pressure transmitting plenum is contained within the walls and where the at least one opening is in at least one wall.

9. The probe of claim 2 where the at least one opening is a longitudinally extending slot having a length greater than its width.

10. A differential pressure measuring probe adapted for placement within a fluid-carrying conduit, comprising,
  a bluff body having a width and a flat upstream facing fluid impact surface coextensive with the width of the body, whereby a localized region of total fluid pressure is created in the fluid across the width of the bluff body.

11. The probe of claim 10, and further including,
  at least one opening in the said impact surface, and
  a fluid carrying channel in communication with the at least one opening for transmitting the said total fluid pressure exteriorly of the conduit.

12. The probe of claim 10 where the flat upstream facing impact surface is adapted to be positioned perpendicularly to the direction of fluid flow in the conduit.

13. A method of measuring differential pressure in the flowing fluid within a closed conduit as a factor in determining the rate of fluid flow in the conduit, comprising,
  creating an upstream zone of relative quiescence stagnation within the flowing fluid proximate the flat upstream facing surface of a bluff body positioned in the flowing fluid perpendicularly to the direction of fluid flow;
  detecting the total pressure of the fluid at the flat upstream facing surface of the bluff body, and
  communicating the total pressure to a pressure sensor.

14. The method of claim 13 and further including,
  creating a downstream zone of relatively quiescent fluid stagnation downstream of the flat upstream facing surface of the bluff body,
  detecting the static pressure of the fluid in the downstream fluid stagnation zone, and
  communicating the static pressure to a pressure sensor.

15. The bluff body of a differential pressure measurement probe for diametric placement within a fluid-carrying conduit, the bluff body comprising,
  a housing having a longitudinal extent and a width defining a fluid impact surface that is substantially flat across the width, the fluid impact surface adapted to face upstream in the fluid conduit substantially normal to the direction of fluid flow, for creating a dome of high fluid pressure thereacross, said housing including, high fluid pressure conduit means, and
    at least one aperture providing fluid communication between the impact surface and the high fluid pressure conduit means.

16. The bluff body of claim 15 where the housing includes, fluid non-impact surface means.

17. The bluff body of claim 16 and further including,
at least one low fluid pressure plenum, and
at least one aperture providing fluid communication between the fluid non-impact surface means and the low fluid pressure plenum.

18. The bluff body of claim 15 where the housing includes a projecting rib having longitudinal and depth aspects and where the rib depth aspect is oriented perpendicularly to the fluid impact surface and is adapted to be disposed parallel to the direction of fluid flow in the conduit and where the longitudinal aspect of the rib substantially corresponds to the longitudinal extent of the flat fluid impact surface means.

19. The bluff body of claim 17 where the housing includes a projecting rib having longitudinal and depth aspects and where the rib depth aspect is oriented perpendicularly to the fluid impact surface and is adapted to be disposed parallel to the direction of fluid flow in the conduit and where the longitudinal aspect of the rib substantially corresponds to the longitudinal extent of the flat fluid impact surface means.

20. The bluff body of claim 15 where the high fluid pressure conduit means comprises a plenum within the housing and further including,
aperture means in the plenum disposed to fluidly communicate with the at least one aperture providing fluid communication between the impact surface and the high fluid pressure conduit means.

21. The bluff body of claim 17 where the high fluid pressure conduit means-comprises a plenum within the housing and further including,
aperture means in the plenum disposed to fluidly communicate with the at least one aperture providing fluid communication between the impact surface and the high fluid pressure conduit means.

22. The bluff body of claim 17 where the at least one low fluid pressure plenum comprises a pair of spaced apart low fluid pressure plenums attached to the housing and where the respective fluid non-impact surface means diverge angularly from a line that is perpendicular to the fluid impact surface means.

23. A system for measuring the rate of fluid flow in a conduit and communicating the data to a process control loop, comprising,
a differential pressure measurement probe having a bluff body for diametric placement within the conduit, said body having,
fluid impact surface means having longitudinal and width extents, for creating a dome of high fluid pressure thereacross,
a high fluid pressure plenum having an interior space,
at least one impact aperture means for providing fluid communication between the impact surface and the interior space of the high fluid pressure plenum, and where the fluid impact surface is substantially flat across the extent of its width, extending bilaterally beyond the at least one aperture means and adapted to face upstream in the fluid conduit substantially normal to the direction of fluid flow,
fluid non-impact surface means,
at least one low fluid pressure plenum having an interior space,
at least one non-impact aperture means for providing fluid communication between the fluid non-impact surface and the interior space of the at least one low fluid pressure plenum,
a process transmitter, including,
a pressure sensor having first and second pressure inlets connected respectively to the high and low pressure plenums,
measurement means coupled to the pressure sensor for providing an electrical output related to the differential pressure between the first and second pressure inlets, and
a loop communicator coupled to the measurement means for providing fluid flow rate data to the control loop.

* * * * *